Patented Aug. 5, 1924.

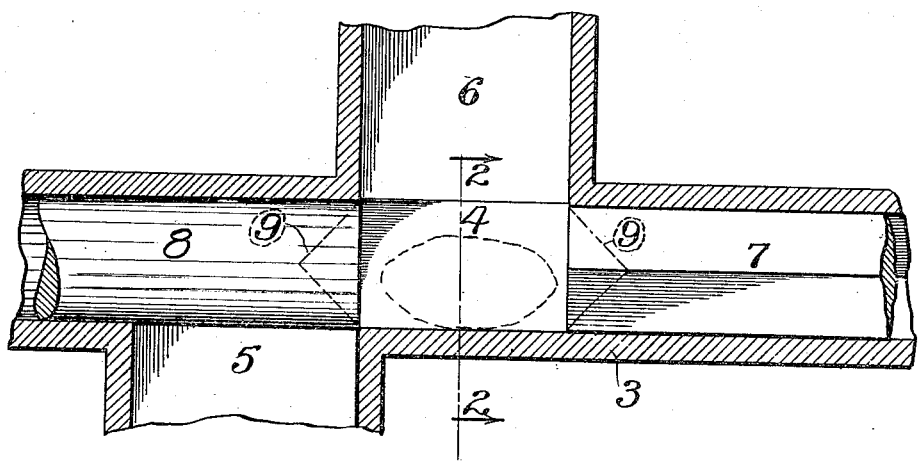
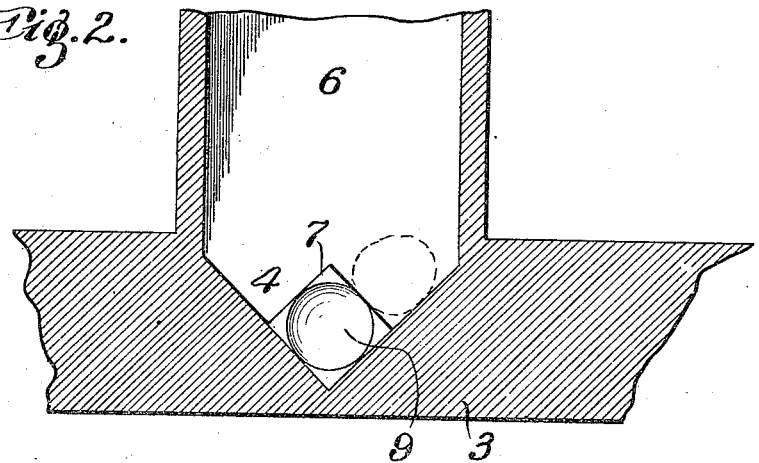

1,504,009

UNITED STATES PATENT OFFICE.

HERMANN WILMS, OF ST. LOUIS, MISSOURI, ASSIGNOR, BY MESNE ASSIGNMENTS, TO R. E. FUNSTEN COMPANY, OF ST. LOUIS, MISSOURI, A CORPORATION OF MISSOURI.

NUT-CRACKING MACHINE.

Application filed March 23, 1923. Serial No. 627,075.

*To all whom it may concern:*

Be it known that I, HERMANN WILMS, a citizen of the United States, and a resident of the city of St. Louis and State of Missouri, have invented a new and useful Improvement in Nut-Cracking Machines, of which the following is a specification.

This invention relates to nut cracking machines of the type shown in my Patent No. 1,470,247, dated October 9, 1923, wherein reciprocating hammer-plungers of circular section work through nut receiving pockets and cooperate with anvil-plungers to crack the nuts between the opposing ends of said plungers. In the operation of such machines, nuts are sometimes fed into the nut receiving pockets during the movement of the hammer-plungers therethrough. In such event, some of the nuts are deposited upon the hammer-plungers with their longitudinal axes disposed transversely or diagonally thereof and are liable to remain in such position after the plungers are withdrawn from the nut receiving pockets and thus prevent the feeding of additional nuts into said pockets.

The principal object of the present invention is a nut cracking machine wherein provision is made for overcoming the disadvantages hereinbefore mentioned. Other objects are simplicity of construction and operation and compactness of design. The invention consists in the construction and combination of parts hereinafter described and claimed.

In the accompanying drawing, which forms part of this specification, and wherein like symbols refer to like parts wherever they occur, Fig. 1 is a vertical longitudinal section through a portion of a nut cracking machine embodying my invention; and Fig. 2 is a vertical cross-section thereof on the line 2—2 in Fig. 1.

The present nut cracking machine, of which only a portion is shown, comprises a suitable table 3 provided with a nut receiving pocket 4, which opens into an enlarged cracking and discharging space or opening 5 that extends through the bottom of said table. The nut receiving pocket 4 is preferably of substantially V-shaped cross-section; that is, the bottom of said pocket slopes downwardly from the opposite sides thereof towards the middle thereof. The nut receiving pocket 4 communicates with the lower end of a vertical passageway or chute 6 adapted to receive the nuts, which are fed thereto in any desired manner.

Mounted in a horizontal bore provided therefor in the table 3 is a reciprocatable hammer-plunger 7. The hammer-plunger 7 is adapted to move through the V-shaped nut receiving pocket 4 and thus force the nut out of said pocket into engagement with the end of an axially yieldable cylindrical anvil-plunger 8. The anvil-plunger 8 is mounted in a cylindrical bore formed in the table 3 and is disposed in axial alinement with the hammer-plunger 7. The opposing ends of the hammer-plunger and the anvil-plunger are provided with conical depressions or recesses 9 adapted to fit the ends of the nut.

The nuts are fed into the passageway 6, preferably one at a time, and drop into the nut receiving pocket 4 at the bottom thereof. The hammer-plunger, at the beginning of its forward movement through the pocket, engages the nut therein and causes its pointed end to seat in the conical depression in the forward end of said plunger. The engaged nut is then forced along the pocket until its forward end seats in the depression formed in the end of the anvil-plunger, whereupon the continued forward movement of the hammer-plunger forces the nuts out of the pockets into the enlarged discharge opening 5. The anvil-plunger is then locked against further movement, by means of suitable mechanism (not shown), and the engaged nut is then cracked between the opposing ends of the hammer-plunger and said anvil-plunger by a continued movement of said hammer-plunger to the end of its forward stroke. After the nuts have been cracked between the cooperating ends of the pair of cooperating plungers, 7 and 8, the hammer-plunger 7 is retracted while the anvil-plunger 8 remains locked, thereby permitting the cracked nuts to fall through the delivery opening 5. In the event of the feeding of a nut into the V-shaped nut receiving pocket during the return movement of the hammer-plunger, the nut upon striking the inclined bottom of the said pocket will be given a tendency to come to rest therein with its pointed ends facing the opposing ends of the cooperating nut engaging plungers.

As shown in the drawing, the hammer-plunger is of substantially square section; and the horizontal bore which receives said plunger is also square and is disposed with one of its corners uppermost and in alinement with the corner formed by the oppositely inclined bottom surfaces of the nut receiving pocket. The lower corner of the plunger receiving bore and the corner of the nut receiving pocket are disposed in the same horizontal plane so that the lower corner of the square hammer-plunger has a snug sliding fit in the corner or angle formed by the reversely sloping surfaces of said pocket. By reason of the construction just described, nuts that are fed into the nut receiving pocket during the travel of the square hammer-plunger therethrough will strike the upper corner of said plunger and roll down the downwardly inclined surfaces thereof into one or the other of the V-shaped troughs or valleys formed by the upper sides of said plunger and the adjacent upper portions of the inclined surfaces of the nut receiving pocket. The nuts received in these troughs or valleys remain therein until the plunger is withdrawn from the nut receiving pocket, whereupon they roll down into the bottom of said pocket in position to be engaged by the advancing hammer plunger.

A very important advantage of this construction is that it prevents nuts that are deposited on the hammer-plunger in positions crosswise thereof from remaining in such positions and thus interfering with the operation of the machine. In the event that a nut is deposited on the hammer-plunger in such transverse position, said nut will roll down the inclined surface of the plunger and come to rest in the desired position between the adjacent sides of the plunger and pocket before it is permitted to reach the bottom thereof. The tendency for the nuts to remain in positions crosswise of the plunger is further resisted by the upper corner of the moving plunger which bears against the under side of the nut and tends to guide the same into the desired cracking position.

It is evident that numerous changes may be made without departing from my invention and I do not wish to be limited to the exact construction shown and described. For instance, the ridge or upper corner of the hammer-plunger may be produced by making the plunger of any desired polygonal section.

What I claim is:

1. A nut cracking machine having a nut receiving pocket, and a reciprocating hammer-plunger working through said pocket, said hammer-plunger having along its upper portion flat surfaces that are inclined downwardly on opposite sides of its middle to form a ridge.

2. A nut cracking machine having a substantially V-shaped nut receiving pocket, and a reciprocating hammer-plunger working through said pocket, said hammer-plunger having along its upper portion flat surfaces that are inclined downwardly on opposite sides of its middle to form a ridge.

3. A nut cracking machine having a nut receiving pocket, and a reciprocating hammer-plunger working through said pocket, said hammer-plunger being of substantially polygonal section and being disposed with one corner uppermost and located substantially midway of the sides of said pocket.

4. A nut cracking machine having a substantially V-shaped nut receiving pocket, and a reciprocating hammer-plunger working through said pocket, said hammer-plunger being of substantially polygonal section and being disposed with one corner uppermost and located substantially midway of the sides of said pocket.

5. A nut cracking machine having a nut receiving pocket, and a nut engaging plunger working in said pocket, said plunger having along its upper portions flat surfaces that are inclined downwardly on opposite sides of its middle, said pocket having flat inclined side walls that cooperate with the downwardly inclined flat surfaces of said plunger to form in connection therewith V-shaped troughs.

6. A nut cracking machine having a V-shaped nut receiving pocket communicating at one end with a nut discharging opening and at the other end with a rectangular bore, a hammer-plunger mounted in said bore and adapted for movement through said nut receiving pocket, said hammer-plunger being of rectangular section and being arranged with one edge uppermost and substantially midway of the sides of said pocket.

Signed at St. Louis, Missouri, this 20th day of March, 1923.

HERMANN WILMS.